US011656622B2

(12) United States Patent
McVeen

(10) Patent No.: US 11,656,622 B2
(45) Date of Patent: May 23, 2023

(54) AUTONOMOUS VEHICLE TRANSPORTATION SYSTEMS AND METHODS

(71) Applicant: Universal City Studios LLC, Universal City, CA (US)

(72) Inventor: Keith Michael McVeen, Winter Garden, FL (US)

(73) Assignee: Universal City Studios LLC, Universal City, CA (US)

(*) Notice: Subject to any disclaimer, the term of this patent is extended or adjusted under 35 U.S.C. 154(b) by 0 days.

(21) Appl. No.: 17/706,402

(22) Filed: Mar. 28, 2022

(65) Prior Publication Data

US 2022/0221861 A1    Jul. 14, 2022

Related U.S. Application Data

(63) Continuation of application No. 16/297,248, filed on Mar. 8, 2019, now Pat. No. 11,287,815.
(60) Provisional application No. 62/742,093, filed on Oct. 5, 2018.

(51) Int. Cl.
  *G05D 1/00*   (2006.01)
  *G05D 1/02*   (2020.01)
(52) U.S. Cl.
  CPC ......... *G05D 1/0088* (2013.01); *G05D 1/0229* (2013.01); *G05D 2201/0212* (2013.01)
(58) Field of Classification Search
  CPC .............. G05D 1/0088; G05D 1/0229; G05D 2201/0212; A63G 31/02; A63G 31/00; A63G 21/20; A63G 25/00
  See application file for complete search history.

(56) References Cited

U.S. PATENT DOCUMENTS

| | | | |
|---|---|---|---|
| 3,386,600 A | 6/1968 | Betjemann | |
| 4,082,042 A | 4/1978 | Barry | |
| 4,509,430 A | 4/1985 | Creissels | |
| 4,712,486 A * | 12/1987 | Tarassoff | B61B 12/022 |
| | | | 104/173.1 |

(Continued)

FOREIGN PATENT DOCUMENTS

| | | | |
|---|---|---|---|
| CN | 102309853 A | 1/2012 | |
| FR | 3001432 A1 * | 8/2014 | B61B 15/00 |

(Continued)

OTHER PUBLICATIONS

PCT/US2019/054532 International Search Report and Written Opinion dated Dec. 4, 2019.

(Continued)

*Primary Examiner* — James J Lee
*Assistant Examiner* — Stephanie T Su
(74) *Attorney, Agent, or Firm* — Fletcher Yoder, PC

(57) ABSTRACT

An amusement park system in accordance with present embodiments includes multiple separated park areas, an autonomous vehicle configured to drive along ground surfaces within the multiple separated park areas, and a gondola system configured to transport the autonomous vehicle between the multiple separated park areas. The amusement park system further includes a control system configured to operate the autonomous vehicle to engage with and disengage from the gondola system to facilitate transport of the autonomous vehicle by the gondola system.

20 Claims, 12 Drawing Sheets

(56) References Cited

U.S. PATENT DOCUMENTS

| | | | |
|---|---|---|---|
| 5,562,040 | A | 10/1996 | Egli |
| 6,162,127 | A | 12/2000 | Ochi |
| 6,210,284 | B1 | 4/2001 | Ochi |
| 6,224,015 | B1 | 5/2001 | Reinhard |
| 6,652,214 | B1 | 11/2003 | Barry |
| 6,792,872 | B1 | 9/2004 | Valdespino |
| 10,238,979 | B2 | 3/2019 | Boyle et al. |
| 2004/0211741 | A1 | 10/2004 | Bustos et al. |
| 2008/0276826 | A1 | 11/2008 | Erhart |
| 2009/0299563 | A1* | 12/2009 | Mikosza ............ B60F 1/00 701/25 |
| 2011/0036939 | A1 | 2/2011 | Easter |
| 2013/0126666 | A1 | 5/2013 | Brown |
| 2016/0070262 | A1 | 3/2016 | Kawash et al. |
| 2018/0056792 | A1 | 3/2018 | Vance |
| 2018/0194371 | A1 | 7/2018 | Richard |
| 2018/0208215 | A1* | 7/2018 | Zamorano Morfín .. B61L 27/04 |
| 2019/0126945 | A1 | 5/2019 | Stubler et al. |

FOREIGN PATENT DOCUMENTS

| | | |
|---|---|---|
| KR | 20140032587 | 3/2014 |
| KR | 20140048475 | 4/2014 |
| KR | 20150015785 | 2/2015 |
| KR | 20150021717 | 3/2015 |
| KR | 20150021718 | 3/2015 |
| NL | 1009494 | 1/2000 |
| WO | 2008029824 A1 | 3/2008 |
| WO | 2007140501 | 12/2017 |

OTHER PUBLICATIONS

"Transporter bridge"; Wikipedia, the free encyclopedia; https://en.wikipedia.org/wiki/Transporter_bridge; Jan. 29, 2019; last accessed Mar. 12, 2019.

Pedicini, Sandra; "Disney World gondolas would connect parks, hotels, documents confirm"; Orlando Sentinel; https://www.orlandosentinel.com/travel/attractions/the-daily-disney/os-bz-disney-world-gondolas-cable-cars-plans-20170418-story.html; Apr. 18, 2017; last accessed Mar. 12, 2019.

Frost, John; "Confirmed: Disney building Gondola aerial transportation system"; Disney World Blog; https://thedisneyblog.com/2017/04/18/confirmed-disney-building-gondola-aerial-transportation-system/; Apr. 2, 2017; last accessed Mar. 12, 2019.

Barber, Megan; "11 urban gondolas changing the way people move: Gondolas aren't just for skiing anymore"; Curbed; https://www.curbed.eom/2017/9/21/16340394/urban-gondolas-cable-cars-cities; Sep. 21, 2017; last accessed Mar. 12, 2019.

"Dual Mode Gondolas—Hook and Anchor"; The Gondola Project; http://gondolaproject.com/2012/03/06/dual-mode-gondolas-hook-and-anchor/; Mar. 6, 2012; last accessed Mar. 12, 2019.

Dale, Steven; "How to Get a Truck To the Top of a Mountain"; The Gondola Project; Mar. 30, 2011; http://gondolaproject.com/2011/03/30/how-to-get-a-truck-to-the-top-of-a-mountain/; last accessed Mar. 12, 2019.

"MDG / Monocable Detachable Gondola"; The Gondola Project; http://gondolaproject.com/mdg/; last accessed Mar. 12, 2019.

"Industry"; LST by MND Group; http://www.lst.eu/en/activity_domain/industrie-en/ last accessed Mar. 12, 2019.

CN Office Action for Chinese Application No. 201980065025.0 dated Sep. 9, 2022.

\* cited by examiner

AUTONOMOUS VEHICLE TRANSPORTATION SYSTEMS AND METHODS

CROSS-REFERENCE TO RELATED APPLICATION

This application is a continuation of U.S. application Ser. No. 16/297,248, entitled "AUTONOMOUS VEHICLE TRANSPORTATION SYSTEMS AND METHODS," filed Mar. 8, 2019, which claims priority to and the benefit of U.S. Provisional Application No. 62/742,093, entitled "AUTONOMOUS VEHICLE TRANSPORTATION SYSTEMS AND METHODS," filed Oct. 5, 2018, each of which is hereby incorporated by reference in its entirety for all purposes.

BACKGROUND

Amusement parks or similar entertainment facilities may move people and goods in a variety of ways within a park environment. However, vehicle transportation within a park is relatively complex. For example, pedestrian paths are often closed to motor vehicles. Moreover, park environments may include one or more portions (e.g., park locations, residence locations), which may be separated by roadways or geographic features. Accordingly, travel throughout the amusement park may be difficult/inconvenient.

This section is intended to introduce the reader to various aspects of art that may be related to various aspects of the present techniques, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

SUMMARY

Certain embodiments commensurate in scope with the originally claimed subject matter are summarized below. These embodiments are not intended to limit the scope of the disclosure, but rather these embodiments are intended only to provide a brief summary of certain disclosed embodiments. Indeed, the present disclosure may encompass a variety of forms that may be similar to or different from the embodiments set forth below.

In accordance with an embodiment, an amusement park system includes multiple separated park areas, an autonomous vehicle configured to drive along ground surfaces within the multiple separated park areas, and a gondola system configured to transport the autonomous vehicle between the multiple separated park areas. The amusement park system further includes a control system configured to operate the autonomous vehicle to engage with and disengage from the gondola system to facilitate transport of the autonomous vehicle by the gondola system.

In accordance with another embodiment, an autonomous vehicle transportation system includes a gondola system, a vehicle configured to at least partially autonomously drive along a surface and comprising a gondola attachment integrally coupled to a top portion of the vehicle. The gondola attachment is configured to support a weight of the vehicle. The gondola attachment includes a locking tool configured to engage with and disengage from the gondola system. The autonomous vehicle transportation system further includes a controller configured to maneuver the vehicle into an engagement position relative to the gondola.

In accordance with a further embodiment, a vehicle transportation system includes multiple vehicles and a gondola station having an arrival zone and a departure zone. A first vehicle of the multiple vehicles is configured to aerially arrive at the arrival zone via a cable of the gondola station, disengage from the cable, and drive along a first path to exit the gondola station. A second vehicle of the multiple vehicles is configured to drive along a second path to enter the gondola station, engage to the cable, and depart from the departure zone via the cable.

BRIEF DESCRIPTION OF THE DRAWINGS

These and other features, aspects, and advantages of the present disclosure will become better understood when the following detailed description is read with reference to the accompanying drawings in which like characters represent like parts throughout the drawings, wherein.

DETAILED DESCRIPTION

Figure 1:
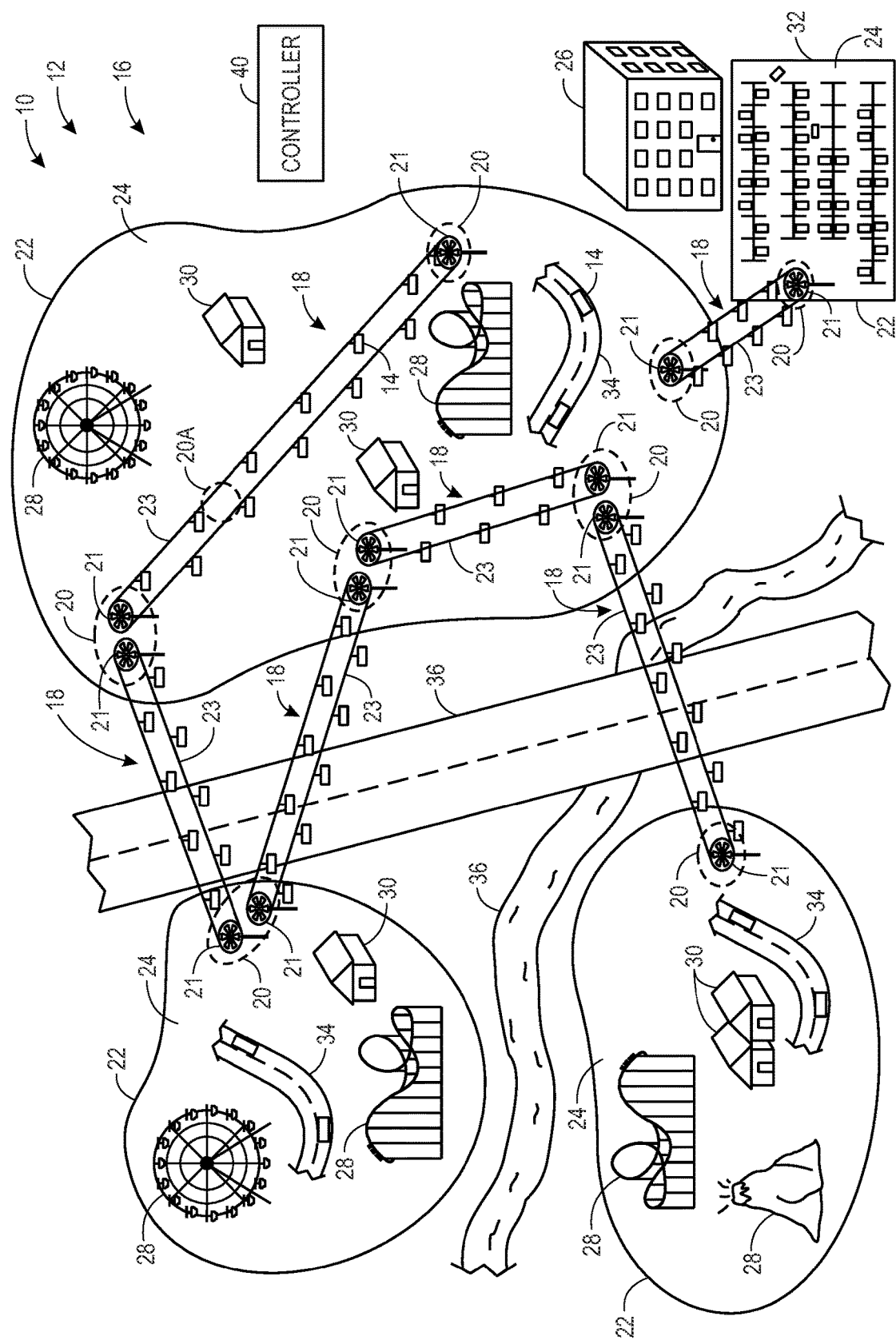
FIG. 1 is a schematic diagram of an amusement park including autonomous vehicles and a gondola-enabled transportation system, in accordance with aspects of the disclosure.

One or more specific embodiments of the present disclosure will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure. Further, to the extent that certain terms such as parallel, perpendicular, and so forth are used herein, it should be understood that these terms allow for certain deviations from a strict mathematical definition, for example to allow for deviations associated with manufacturing imperfections and associated tolerances.

Provided herein is an autonomous vehicle transportation system that includes autonomous vehicles and a gondola system. The autonomous vehicles are configured to autonomously (e.g., without continuous user input) transport users and goods within an amusement park area. However, in some embodiments, amusement park areas may be separated by one or more obstacles, such as geographic features and/or various infrastructure, such as public road ways. Indeed, it may be desirable to travel to the separate amusement park areas with the autonomous vehicles while avoiding the obstacles. Accordingly, the autonomous vehicle transportation system may utilize the gondola system to carry the autonomous vehicles to the separate amusement park areas (or within the amusement park areas) while avoiding the obstacles.

In some embodiments, the autonomous vehicle (e.g., "the vehicle") may include a gondola attachment integrally coupled to a top of the vehicle. The gondola attachment is configured to facilitate engagement between the vehicle and the gondola system. For example, in one embodiment, the gondola attachment integrally coupled to the vehicle may be configured to engage with a gondola arm via a locking device disposed at an end of the gondola arm. That is, the vehicle is configured to drive to a gondola station, engage with a gondola arm of the gondola station via the gondola attachment, and be carried along a gondola path (e.g., a cable path) via the gondola arm. In another embodiment, the gondola attachment integrally coupled to the vehicle may include the gondola arm. That is, the vehicle is configured to drive within an amusement park area with the gondola arm integrally coupled to a top of the vehicle. The vehicle is further configured to drive to a gondola station, couple to a cable of the gondola station via a grip disposed on an end of the gondola arm, and be carried along the gondola path (e.g., the cable path) via the cable. In yet another embodiment, the gondola system may include a vehicle compartment coupled to an end of the gondola arm. In such embodiments, the vehicle is configured to drive to a gondola station, drive into the vehicle compartment, engage with the vehicle compartment, and be carried along the gondola path (e.g., the cable path) via the gondola compartment.

The gondola stations may further include a variety of embodiments configured to facilitate engagement and disengagement between the vehicle and the gondola system. For example, the gondola stations may include arrival zones, where the vehicles may arrive from a gondola path and disengage from the gondola system. The gondola stations may further include departure zones, where the vehicles may engage with the gondola system and depart along a gondola path via the cable. For example, when preparing to engage with the gondola system, the vehicle may be guided by a loading path to a center line of the loading path. The loading path may include guide rails configured to contact sides of the vehicle to guide the vehicle to the center line. The loading path may further include a sub-surface positioning system configured to guide the vehicle to the center line.

To that end, the features of an autonomous vehicle transportation system as provided herein may be used in conjunction with the disclosed embodiments. FIG. 1 is a schematic view of an amusement park 10 (e.g., amusement park system) that utilizes an autonomous vehicle transportation system 12 to transport goods and/or users (e.g., passengers) throughout the amusement park 10. Particularly, the autonomous vehicle transportation system 12 may include vehicles 14 (e.g., autonomous vehicles, vehicles, transport units, personal rapid transit (PRT) vehicles, gondola vehicles) configured to transport guests and/or equipment/goods throughout the amusement park 10. The vehicles 14 may be autonomous or semi-autonomous vehicles configured to travel to various locations throughout the amusement park 10 to pick up/deliver guests and/or goods. To travel throughout the amusement park 10, the vehicles 14 may utilize a gondola system 16 of the autonomous vehicle transportation system 12. The gondola system 16 is configured to carry the vehicles 14 in an aerial manner along gondola paths 18 (e.g., ropeways, cable paths) between gondola stations 20, which may include bull wheels 21 configured to motivate a cable 23 along the gondola path 18. In this way, the gondola system 16 may transport the vehicles 14 to/from the gondola stations 20 while avoiding various infrastructure (e.g., walking paths, public roadways, buildings, attractions) or geographic obstacles.

Generally, the vehicles 14 are configured to travel along the ground within park boundaries 22. The park boundaries 22 may define one or more park areas 24 that include locations of interest, such as guest housing 26, attractions 28, shops 30, parking lots 32, and so forth. The vehicles 14 are configured to travel of their own accord (e.g., autonomously via an on-board controller) within the park boundaries 22 of the park areas 24. For example, in some embodiments, the vehicles 14 may be configure to travel along predetermined vehicle paths 34 within the park areas 24 to transport guests/goods to different portions of the park areas 24. However, it may be difficult to travel between the park areas 24 of the amusement park 10. Indeed, in some embodiments, the park areas 24 may be separated by obstacles 36 such as public highways or roadways, land forms, bodies of water, and other elements that may hinder surface traveling. For example, as used herein, land forms may refer to an area of land absent of infrastructure designed for vehicular and/or pedestrian travel. Accordingly, provided herein is the gondola system 16, which is configured to carry the vehicles 14 between the park areas 24 so as to avoid the obstacles. Further, it should be understood that, while shown and discussed substantially in reference to the amusement park 10, the autonomous transportation system 12 may be applied to any suitable environment, such as resorts, cities, or other environments.

The autonomous vehicle transportation system 12, defined by the vehicles 14 and the gondola system 16, may be communicatively coupled to a controller 40, which may represent a single master control system or multiple distributed control systems. The controller 40 may provide instructions to the vehicles 14 and/or the gondola system 16 to transport the vehicles 14 between and/or within the park areas 24, as discussed herein.

Figure 2:
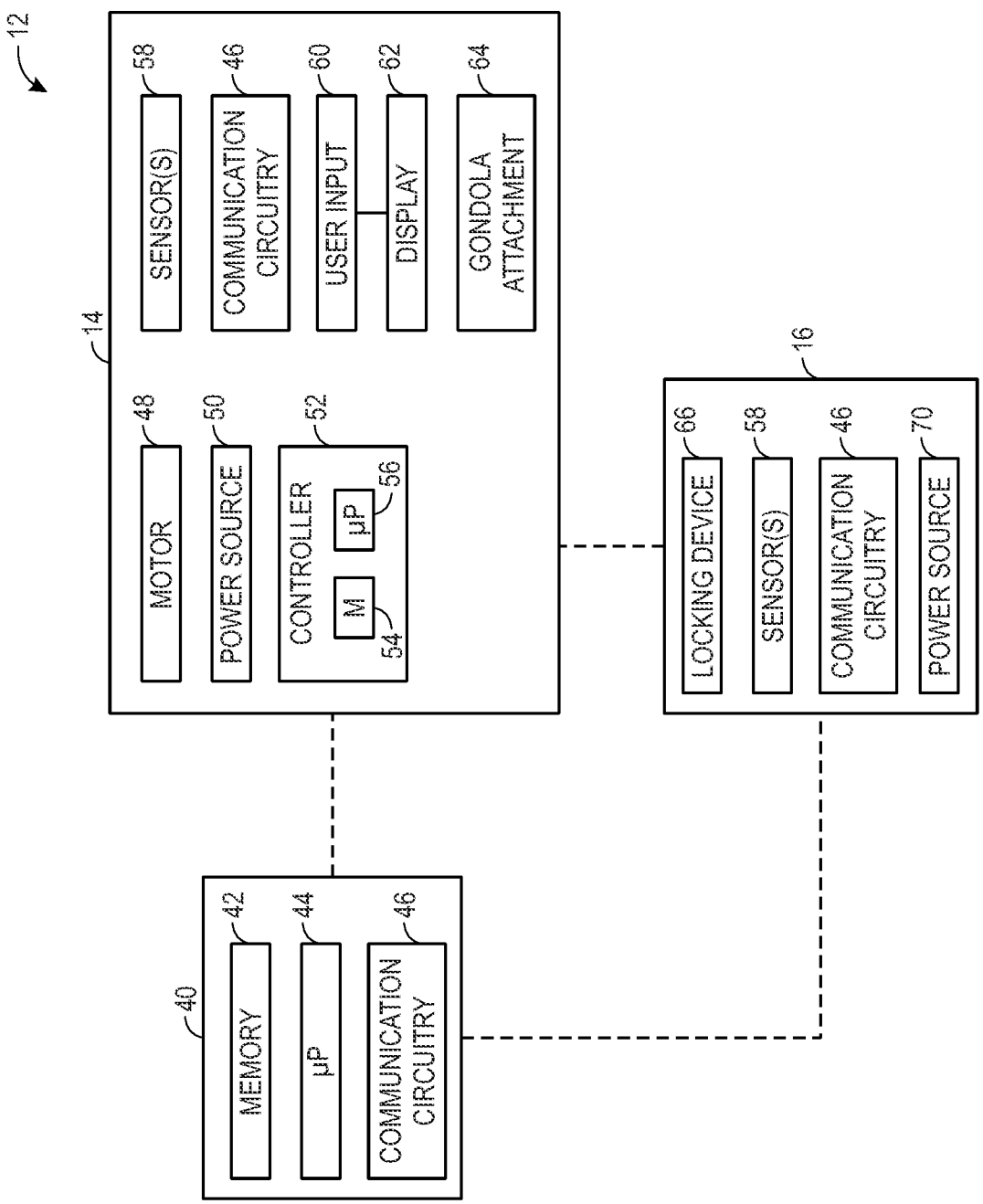
FIG. 2 is a block diagram of components of an autonomous vehicle transportation system, in accordance with aspects of the present disclosure.

FIG. 2 is a block diagram of certain components of the autonomous vehicle transportation system 12. It should be understood that the illustrated components may have additional software or hardware elements. Further, the functionality of various disclosed hardware or software elements may be duplicated and/or exchanged in the illustrated components.

The autonomous vehicle transportation system 12 may be configured to operate at least in part via instructions from the controller 40, which may include a memory 42 for storing instructions executable by a processor 44 to perform the methods and control actions described herein. The processor 44 may include one or more processing devices, and the memory 42 may include one or more tangible, non-transitory, machine-readable media. By way of example, such machine-readable media can include RAM, ROM, EPROM, EEPROM, CD-ROM, or other optical disk storage, magnetic disk storage or other magnetic storage devices, or any other medium which can be used to carry or store desired program code in the form of machine-executable instructions or data structures and which can be accessed by the processor 44 or by a special purpose or programmed computer or other machine with a processor.

In addition, the controller 40 may be configured to include communication circuitry 46 (e.g., a transceiver or other communications devices) to communicate over wired and wireless communication paths with one or more other components of the autonomous vehicle transportation system 12.

As discussed, the autonomous vehicle transportation system 12 may include one or more autonomous vehicles 14 that includes a motor 48 and a power source 50 (e.g., a battery, a solar panel, an electrical generator, a gas engine, or any combination thereof). The operations of the motor 48 may be controlled by a vehicle controller 52 including a memory 54 and a processor 56 and configured to operate any on-board logic to control vehicle paths or progress. For example, the vehicle 14 may respond to local environmental input via one or more on-board sensors 58. The vehicle controller 52 may control the motor 48 to adjust its output power to accelerate or decelerate the vehicle 14. The vehicle controller 52 may also control a brake to decelerate or stop the vehicle 14. Further, the vehicle controller 52 may operate under instructions from the rider (e.g., guest, passenger) via a user input interface, or user input 60 (e.g., system or device for receiving input), or from the controller 40, via communication circuitry 46. For example, the user may utilize the user input 60 to input a desired destination. The vehicle controller 52 and/or the controller 40 may communicate to the user via a display 62. For example, the display 62, which may be a portion of the user input 60, may show the user a future destination, a time remaining until the destination is reached, or optional stops along the way to the destination. To illustrate, in some embodiments, a user may input a desired destination to the vehicle controller 52 and/or the controller 40. As the autonomous vehicle 14 travels to the destination, the vehicle 14 may utilize the gondola paths 18 of the gondola system 16. While traveling along the gondola paths 18, the vehicle 14 may travel through one or more of the gondola stations 20. Accordingly, at each juncture of the gondola paths 18, such as at the gondola stations 20, the user may have the option to adjust the current travel route of the vehicle 14, such as by disengaging from the gondola system 16 and traveling by ground to a different destination, as opposed to continuing along the gondola path 18. Generally, the controller 40 may receive a first signal indicative of a first location of the vehicle 14, receive a second signal indicative of a second location from the display 62 (e.g., user interface) of the vehicle 14, and provide a third signal to the vehicle controller 52 of the vehicle 14 to cause the vehicle 14 to travel from the first location to the second location.

The autonomous vehicle 14 may store image and/or navigation files of the amusement park 10 in the memory 54 such that navigation may be executed using the processor 56 of the vehicle controller 52 to execute on-board logic. The sensors 58 may include one or more cameras, laser scanners, and/or ultrasonic scanners that provide inputs to the vehicle controller 52 to execute turns or navigation instructions to avoid obstacles. In some embodiments, the sensors 58 may include a global positioning system (GPS) configured to detect a position of the vehicle 14. The sensors 58 may communicate the position of the vehicle 14 to the vehicle controller 52 and/or the controller 40 for navigation purposes.

The autonomous vehicle 14 may further include a gondola attachment 64 (e.g., a locking device) integrally coupled to the vehicle 14 and configured to engage, or couple, the autonomous vehicle 14 with the gondola system 16. That is, as discussed in further detail below, the autonomous vehicle 14 is configured to drive to a gondola station 20 of the gondola system 16, engage with the gondola system 16 via the gondola attachment 64, and be transported to a corresponding gondola station 20 via the gondola path 18. Accordingly, the gondola system 16 may include a corresponding locking device 66 configured to engage with the gondola attachment 64 of the vehicle 14. In some embodiments, the gondola system 16 may further include sensors 58 configured to detect the engagement of the vehicle 14 and the gondola system 16. The sensors 58 may include, for example, pressure sensors configured to detect a weight (e.g., a presence) of the vehicle 14 on the gondola system 16. The sensors 58 may further include proximity sensors configured to detect engagement of the gondola attachment 64 of the vehicle 14 with the locking device 66 of the gondola system 16.

The gondola system 16 may communicate with the controller 40 via the communication circuitry 46, which may include a bus bar, for example. In one embodiment, the sensors 58 may send data indicative of engagement of the vehicle 14 with the gondola system 16 to the controller 40 via the communication circuitry 46. The gondola system 16 may further include a power source 70 configured to provide power to the locking device 66, the sensors 58, and the communication circuitry 46. The power source 70 may include, for example, a battery, a solar panel, an electrical generator, a gas engine, an electrical power grid, or any combination thereof. In some embodiments, the power source 70 of the gondola system 16 may be configured to provide power to the power source 50 of the vehicle 14 via charging a battery, or as a substitute power source, for example.

Figure 3:
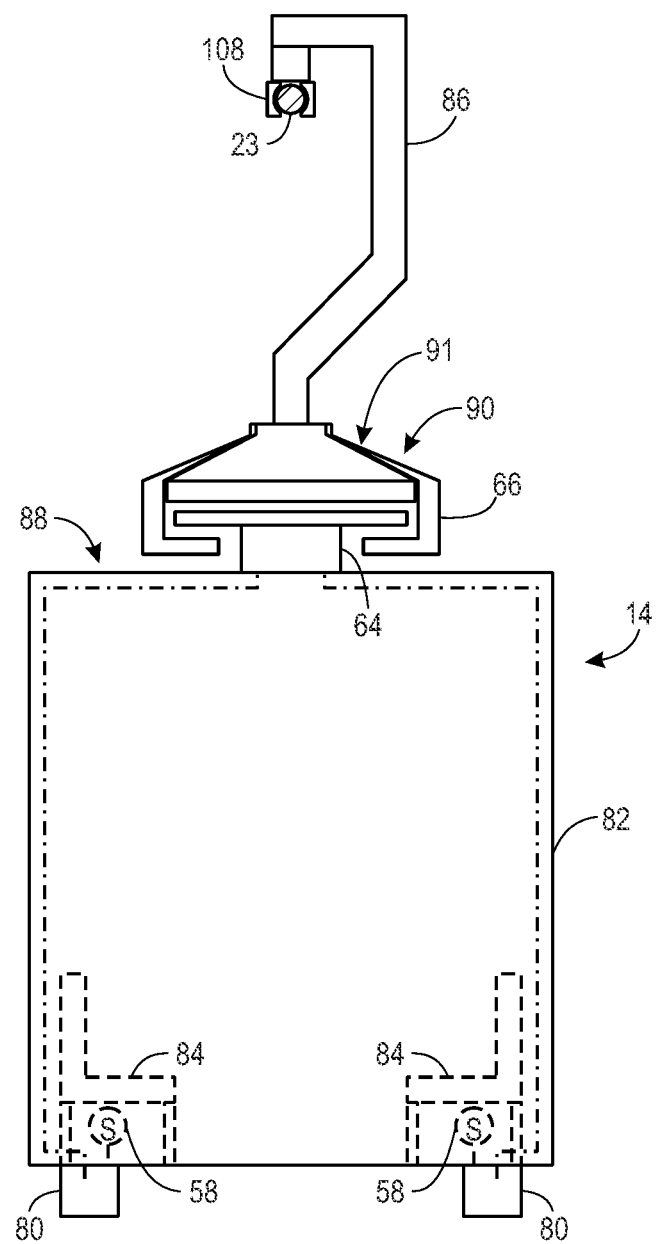
FIG. 3 is a schematic diagram of an embodiment of an autonomous vehicle of the autonomous vehicle transportation system of FIG. 2, in accordance with aspects of the present disclosure.

FIG. 3 is a schematic view of an embodiment of the autonomous vehicle 14. The vehicle 14 includes wheels 80 configured to drive the vehicle 14 throughout the amusement park 10, a frame 82 configured to provide structural support for the vehicle 14, one or more seats 84 configured to provide seating for users/guests, and the gondola attachment 64 configured to couple with the gondola system 16.

Generally, to maneuver the vehicle 14 through the amusement park 10, the wheels 80 are configured to drive the vehicle 14 utilizing power from the power source 50. The wheels 80 are also configured to steer the vehicle 14 according to input from the vehicle controller 52. For example, the wheels 80 may cause the vehicle 14 to travel to gondola stations 20 of the gondola system 16. At the gondola stations 20 of the gondola system 16, the vehicle 14 is configured to couple to a gondola arm 86 of the gondola system 16 via the gondola attachment 64. The gondola attachment 64 is integrally coupled (e.g., bolted, welded) to a top 88 (e.g., roof) of the frame 82 of the vehicle 14. Indeed, the vehicle 14 is configured to be vertically supported (e.g., carried) via the gondola attachment 64. In other words, the frame 82 of the vehicle 14 is structured (e.g., reinforced) to provide support in the vertical direction such that an entirety of a weight of the vehicle 14, and any cargo (e.g., people, goods) in the vehicle 14, may be supported from the gondola attachment 64 via the frame 82.

The gondola attachment 64 is configured to engage with the gondola locking device 66 included in a base 90 (e.g., a first end) of the gondola arm 86. As discussed herein, engagement between the vehicle 14 (e.g., via the gondola attachment 64) and the gondola system 16 (e.g., via the locking device 66) may refer to one or more components (e.g., one or more locking tool 91) of the gondola attachment 64 actuating to couple to one or more components of the gondola locking device 66, or vice versa. For example, engagement may refer to the locking device 66 (e.g., the locking tool 91) clamping on to the gondola attachment 64, or the gondola attachment 64 (e.g., the locking tool 91) extending protrusions (e.g., pins) into receptacles of the locking device 66. In some embodiments, engagement may refer to one or more components of the gondola attachment 64 (e.g., the locking tool 91) and/or the gondola locking device 66 rotating to engage the vehicle 14 and the gondola system 16.

In some embodiments, engagement between the gondola attachment 64 and the gondola locking device 66 may be caused in part by input from the wheels 80. For example, the wheels 80 may be communicatively coupled (e.g., electrically and/or mechanically) to the gondola attachment 64. To this end, the gondola attachment 64 (e.g., the locking tool 91) may be configured to engage with the gondola locking device 66 if a weight (e.g., a force) experienced by the wheels 80 is below a predetermined threshold. Specifically, the weight being below the predetermined threshold may indicate that the vehicle 14 is being supported by the gondola system 16, as opposed to by the wheels 80. In some embodiments, the sensor 58 may include a pressure sensor that is configured to detect a weight on the wheels 80. The sensor 58 may send data indicative of the weight on the wheels 80 to the vehicle controller 52, which may cause the gondola attachment 64 to engage with the gondola locking device 66 if the weight is below the predetermined threshold. Further, in one embodiment, the wheels 80 are configured to transition between a first, retracted, position and a second, extended position. The wheels 80 may be in the first position when the weight of the vehicle 14 is being supported via the wheels 80 and may be in the second position when the weight of the vehicle 14 is being supported through a different point, such as via the gondola attachment 64. Accordingly, a transition from the first, retracted position, to the second, extended position, may cause the vehicle 14 to engage with locking device 66. It should be noted that other sensors may also be used to ascertain an engagement. For example, pressure sensors located at an engagement point may be utilized.

Figure 4:
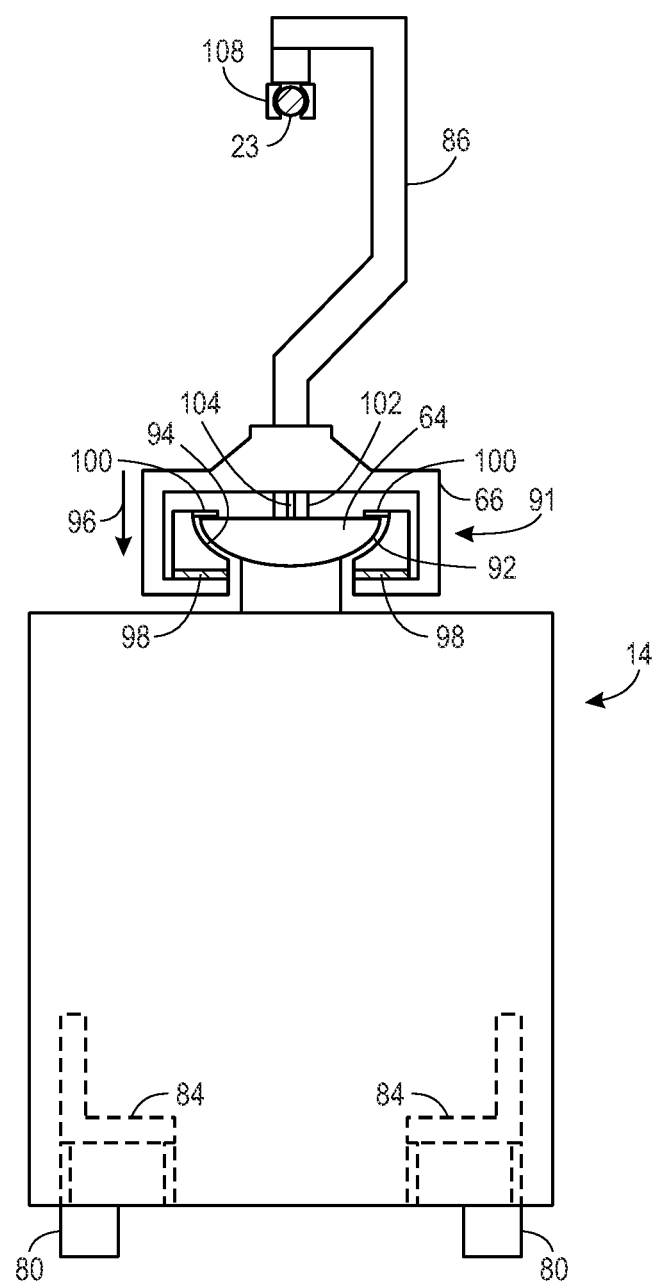
FIG. 4 is a schematic diagram of an embodiment of an autonomous vehicle of the autonomous vehicle transportation system of FIG. 2, in accordance with aspects of the present disclosure.

FIG. 4 is schematic view of the vehicle 14 engaged with the gondola arm 86. As discussed above in reference to FIG. 3, the vehicle 14 includes the wheels 80 configured to drive the vehicle 14 throughout the amusement park 10, the frame 82 configured to provide structural support for the vehicle 14, the one or more seats 84 configured to provide seating for users/guests, and the integral gondola attachment 64 configured to couple with the gondola system 16. Further, as shown, in some embodiments, the gondola attachment 64 (e.g., the locking tool 91) may include a convex surface 92 configured to interact with a concave surface 94 of the locking device 66 of the gondola arm 86 to facilitate engagement between the vehicle 14 and the gondola arm 86. For example, the corresponding convex and concave surfaces 92, 94 of the gondola attachment 64 and the locking device 66 of the gondola arm 86, respectively, serve to guide the gondola attachment 64 into the gondola locking device 66 of the gondola arm 86. In this manner, when the gondola attachment 64 is inserted into the gondola locking device 66, the gondola attachment 64 may be centered onto the gondola locking device 66, such as by sliding along the concave surface 94 of the gondola locking device 66.

Further in some embodiments, when the gondola attachment 64 is disposed within the gondola locking device 66, the gondola attachment 64 may apply a downward force to the gondola locking device 66, as indicated by arrow 96. In some embodiments, the downward force may be caused by the gondola arm 86 moving upward, away from the vehicle 14 (e.g., due to the movement of the gondola arm 86 with the cable 23). When the gondola attachment 64 applies the downward force to the gondola locking device 66, pressure mechanisms 98 (e.g., pressure switches, sensors) disposed below the locking device 66 may experience the downward force and cause one or more components of the locking device 66 to actuate to secure (e.g., engage) the gondola attachment 64 in the locking device 66. For example, when the pressure mechanisms 98 sense the downward force, one or more latches 100 may be actuated to hold the gondola attachment 64 within the locking device 66. Particularly, the one or more latches 100 may be mechanically activated, such as by a result of the downward force applied to the pressure mechanisms 98, or electrically activated, such as by a result of signals sent from the controller 40 based on the downward force experienced by the pressure mechanism 98. Moreover, in some embodiments, the gondola attachment 64 may be configured to passively engage with the locking device 66 of the gondola arm 86. For example, the gondola attachment 64 and/or the locking device 66 may include one or more pawls 102. The one or more pawls 102 each include a pivoted bar configured to allow movement in one direction, and block movement in another direction. For example, the one or more pawls 102 may allow the movement of insertion of the gondola attachment 64 into the locking device 66 and block the movement of extraction of the gondola attachment from the locking device 66. Indeed, during decoupling, or disengagement, of the gondola attachment 64 and the locking device 66, the pawls 102 may be retracted, such as by an actuator 104, to allow the movement of extraction of the gondola attachment 64 from the locking device 66.

Figure 5:
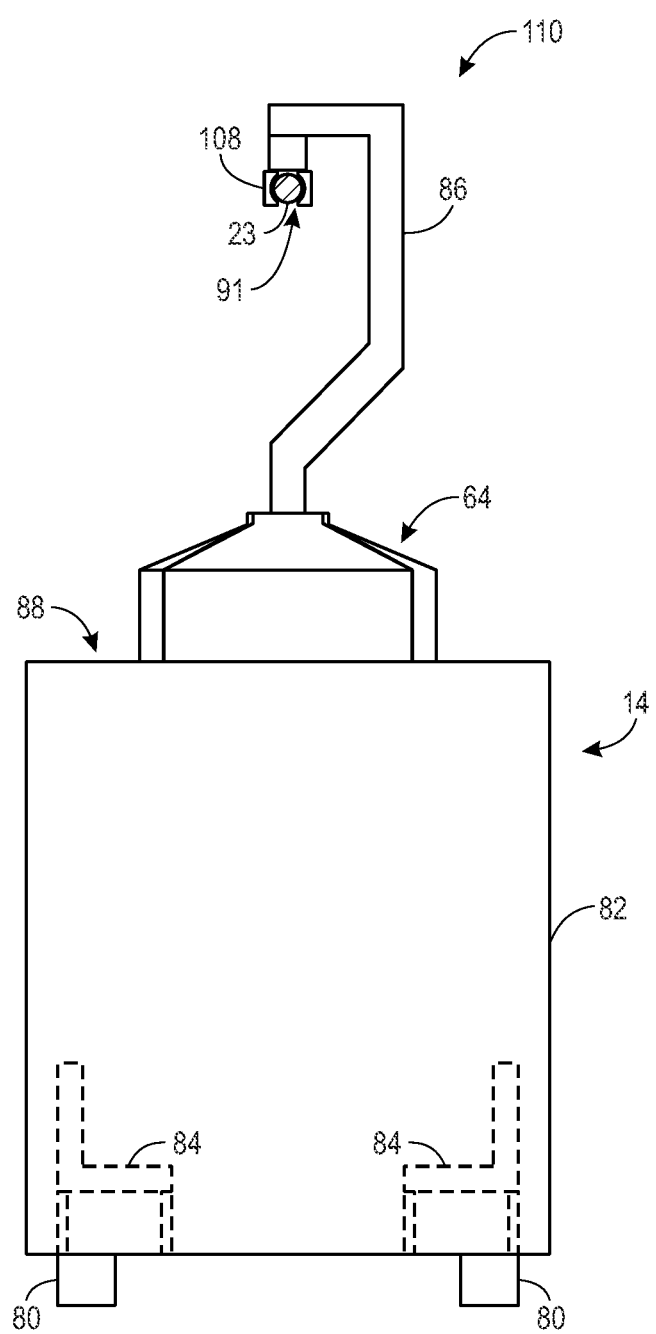
FIG. 5 is a schematic diagram of an embodiment of an autonomous vehicle of the autonomous vehicle transportation system of FIG. 2, in accordance with aspects of the present disclosure.

FIG. 5 is a schematic view of an embodiment of the autonomous vehicle 14. Similar to embodiments discussed above, the vehicle 14 includes the wheels 80 configured to drive the vehicle 14 throughout the amusement park 10, the frame 82 configured to provide structural support for the vehicle 14, the one or more seats 84 configured to provide seating for users/guests, and the integral gondola attachment 64 configured to couple with the gondola system 16. In the current embodiments, the integral gondola attachment 64 is configured to couple directly to the cable 23, or rope, of the gondola system 16. Particularly, the gondola attachment 64, which is integrally coupled to the frame 82 of the vehicle 14, may include the gondola arm 86. In other words, the vehicle 14 is configured to drive throughout the amusement park 10 with the gondola arm 86 integrally attached to the top 88 (e.g., roof) of the vehicle 14. When the vehicle 14 travels to a gondola station 20 of the gondola system 16, the vehicle 14 is configured to couple to the gondola system 16 via a grip 108 (e.g., (e.g., the locking tool 91, a detachable grip, a coupling mechanism, a clamp, etc.) disposed at a second end 110 of the gondola arm 86. In certain embodiments, the grip 108 may be activated to couple to and decouple from the cable 23 through interaction with one or more structures of the gondola stations 20, as discussed in further detail below.

Figure 6:
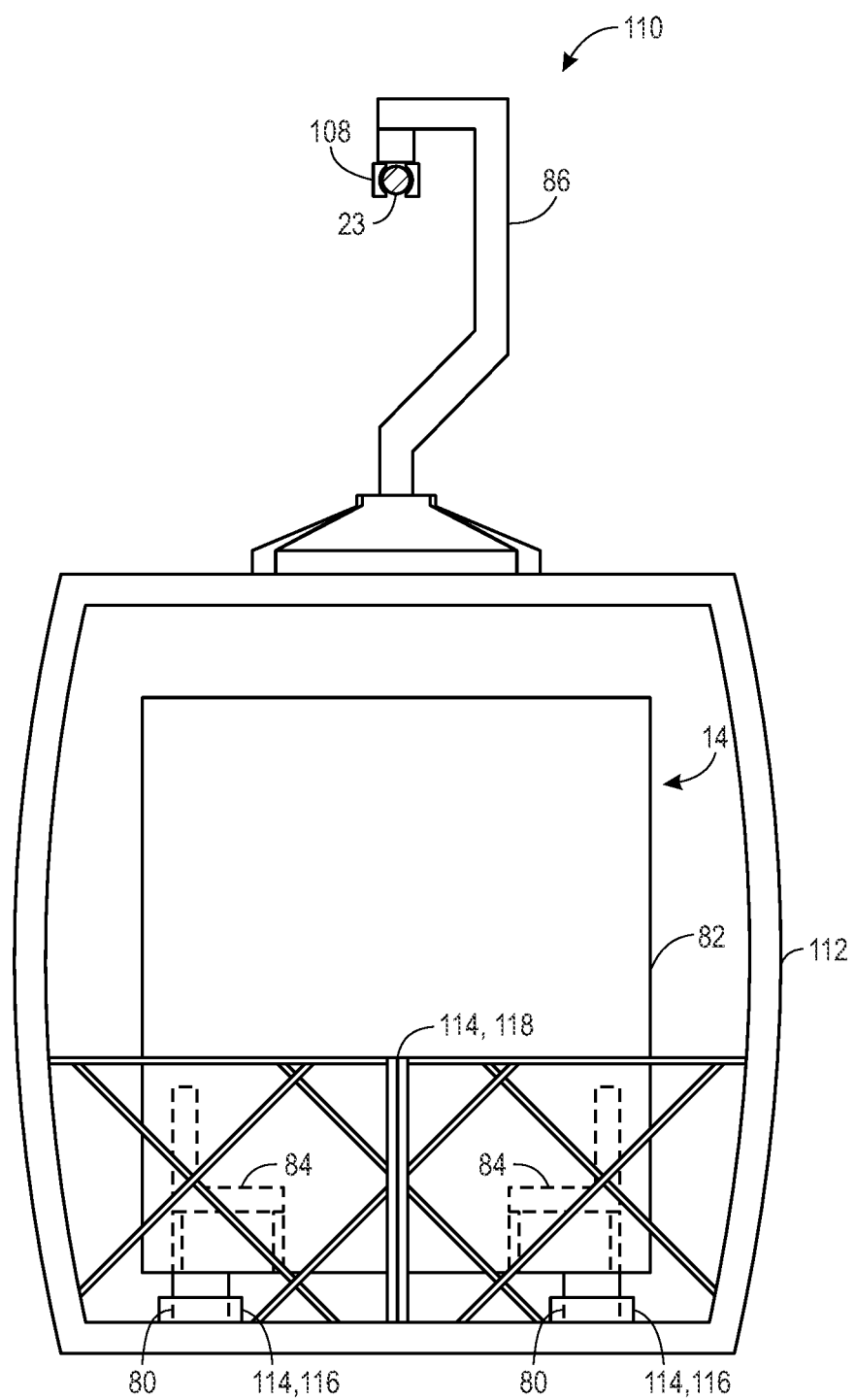
FIG. 6 is a schematic diagram of an embodiment of an autonomous vehicle of the autonomous vehicle transportation system of FIG. 2, in accordance with aspects of the present disclosure.

FIG. 6 is a schematic view of an embodiment of the autonomous vehicle 14 coupled to the gondola system 16 via a vehicle compartment 112 extending from the gondola arm 86. Similar to embodiments discussed above, the vehicle 14 may include the wheels 80 configured to drive the vehicle 14 throughout the amusement park 10, the frame 82 configured to provide structural support for the vehicle 14, and the one or more seats 84 configured to provide seating for users/guests. The vehicle compartment 112 includes one or more security devices 114 to secure the vehicle 14 to the vehicle compartment 112. Because the vehicle 14 is configured to be coupled to the gondola system 16 via the vehicle compartment 112, the frame 82 of the vehicle 14 in the illustrated embodiment may not necessarily provide support for the vehicle 14 in the vertical direction, as discussed above. Indeed, in the current embodiment, the vehicle 14 may be lesser in weight as compared to other embodiments discussed herein, which may include the integral gondola attachment 64 and the frame 82 configured to support the vehicle 14 from the vertical direction. The reduced weight of the vehicle 14 in the current embodiment may be advantageous for more efficient power/fuel consumption during use of the vehicle 14.

In some embodiments, the security devices 114 may include wheel locks 116 configured to engage with the wheels 80 of the vehicle 14. Accordingly, when the vehicle 14 drives into the vehicle compartment 112, the wheel locks 116 are configured to engage with the wheels 80 to couple the vehicle 14 to the vehicle compartment 112. Further, in some embodiments, the security devices 114 may include a barrier 118 (e.g., a gate) configured to secure the vehicle 14 within the vehicle compartment 112. In some embodiments, the barrier 118 may be configured to actuate between an open and a closed position. While the barrier 118 is in the open position, the vehicle 14 may be permitted to enter and leave the vehicle compartment 112. In some embodiments, while in the open position, the barrier 118 may serve as a ramp to facilitate entrance or departure of the vehicle 14 to/from the vehicle compartment 112. While the barrier 118 is in the closed position, if the vehicle 14 is disposed within the vehicle compartment 112, the barrier 118 may prevent, or block, the vehicle 14 from leaving the vehicle compartment 112. Particularly, in some embodiments, while the barrier 118 is in the closed position, the barrier 118 may contact the vehicle 14 to hold the vehicle 14 in a stable and stationary position within the vehicle compartment 112. In some embodiments, the security devices 114 may operate based on one or more signals from the vehicle controller 52 and/or the controller 40. That is, the controller(s) 40, 52 may send signals to the security devices 114 to cause the security devices 114 to actuate to lock the vehicle 14 within the vehicle compartment, as discussed above, or may actuate to release (e.g., decouple) the vehicle 14 from the vehicle compartment 112. In some embodiments, the security devices 114 may be mechanically actuated, such as by a weight of the vehicle 14 within the vehicle compartment 112. Further, it is to be understood that the vehicle compartment 112 is also configured to accept objects/devices/systems other than the vehicle 14. For example, the vehicle compartment 112 is configured to contain/transport autonomous cars, regular cars, bikes, and/or people.

It should be noted that all of the various embodiments (e.g., the embodiments shown in FIGS. 3-6 of the vehicle 14) may be combined with any of the various loading/unloading station arrangements set forth herein. Indeed, various combinations of attachment mechanisms, vehicle configurations, and loading station arrangements may be employed in any of numerous combinations based on the presently disclosed embodiments. The illustrated embodiments are representative and the present disclosure is not limited to merely illustrated embodiments.

Figure 7:
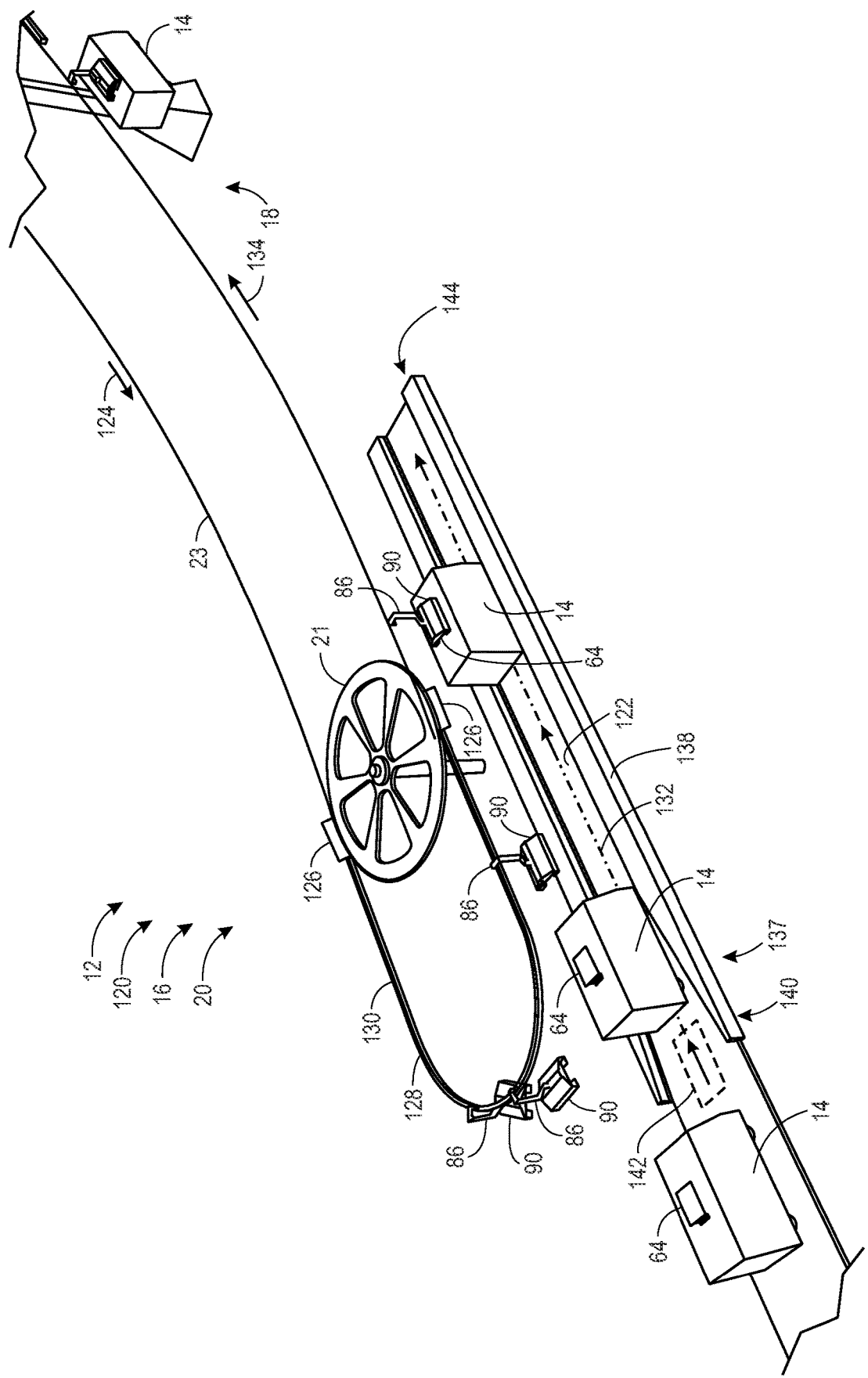
FIG. 7 is a perspective view of an embodiment of the autonomous vehicle transportation system of FIG. 2, in accordance with aspects of the present disclosure.

FIG. 7 is a perspective view of the autonomous vehicle transportation system 12, which includes the vehicles 14 and the gondola system 16. Specifically, FIG. 7 includes a view of a departure zone 120 of a gondola station 20. That is, the vehicles 14 may arrive to the departure zone 120 via a loading path 122 (e.g., loading track), couple to the cable 23 of the gondola system 16 via the gondola arm 86, and depart along the gondola path 18 to a corresponding gondola station 20.

In the current embodiment, the gondola system 16 includes the gondola arm 86 with the gondola locking device 66 coupled to the base 90 of the gondola arm 86, as discussed above in reference to FIGS. 3 and 4. As the gondola arm 86 arrives to the gondola station 20, as indicated by arrow 124, the gondola arm 86 may be coupled to the cable 23 via the grip 108 (shown in FIG. 3). When the gondola arm 86 reaches the bull wheel 21, the grip 108 may interact with an attachment manager 126 coupled to an arm carrier 128 (e.g., holding track) of the gondola system 16. Particularly, the arm carrier 128 is configured to transfer gondola arms 86 and/or vehicle compartments 112 between locations (e.g., engagement/disengagement locations) within the gondola station 20 and to store gondola arms 86 and/or vehicle compartments 112 subsequent to disengagement and prior to engagement to vehicles 14. The attachment manager 126 may disengage the grip 108 from the cable 23, and position the gondola arm 86 on the arm carrier 128. The arm carrier 128 may include one or more drive elements 130 (e.g. individually powered wheels) configured to move each gondola arm 86 along the arm carrier 128. Particularly, the drive elements 130 may move the gondola arm 86 to a center line 132 of the loading path 122 to couple to a vehicle 14. For example, when the gondola arm 86 is positioned on the center line 132 the loading path 122, the locking device 66 of the gondola arm 86 may couple to the gondola attachment 64 of a vehicle 14. Indeed, while the vehicle 14 is positioned on the center line 132, the vehicle 14 may be considered in an engagement position to engage with the gondola system 16. Once the gondola arm 86 is coupled to the gondola attachment 64, the drive elements 130 may drive the gondola arm 86 and the vehicle 14 toward a second attachment manager 126. When the grip 108 of the gondola arm 86 interacts with the attachment manager 126, the attachment manager 126 may position the grip 108 onto the cable 23 and cause the grip 108 to couple to the cable 23. Once the grip 108 of the gondola arm 86 is coupled to the cable 23, the cable 23 may carry the gondola arm 86 and the vehicle 14 to the corresponding gondola station 20, as indicated by arrow 134. Indeed, the arm carrier 128 is configured to store a plurality of gondola arms 86 as the gondola arms 86 arrive to the gondola station 20. In some embodiments, the controller 40 may monitor the location of the vehicles 14 and may send one or more signals to the drive elements 130 to cause the gondola arms 86 to be moved to the center line 132 as the vehicles 14 approach the loading path 122. Further, in certain embodiments, if the arm carrier 128 is at capacity for storing gondola arms 86, the controller 40 may cause the drive elements 130 to move the gondola arms 86 along the arm carrier 128 to couple to the cable 23 to make room for more arriving gondola arms 86. Indeed, once coupled to the cable 23, the gondola arm 86 will be passed to the corresponding gondola station 20.

The loading path 122 (e.g., loading track) may include a guidance system 137 utilized to facilitate loading, or engagement, of the vehicle 14 onto the cable 23 of the gondola system 16 for aerial travel across the amusement park 10. For example, the guidance system 137 may include guide rails 138 that are configured to contact sides of the vehicle 14 to guide the vehicle 14 to the center line 132 along the loading path 122 to facilitate engagement between the vehicle 14 and the gondola arm 86. In some embodiments, the guide rails 138 may include a flared entrance 140. Indeed, the guide rails 138 may serve as a funnel configured to guide the vehicle 14 to the center line 132 on the loading path 122. Further, in some embodiments, the guidance system 137 may have one or more sub-surface positioning systems 142 configured to position the vehicle 14 onto the center line 132. That is, the sub-surface positioning system 142 may include one or more elements configured to interact with the wheels 80 (or an underside) of the vehicle 14 to position the vehicle 14 on the center line 132. For example, in some embodiments, the sub-surface positioning system 142 of the loading path 122 may include the grid elements of the dynamic driving area of U.S. Pub. No. 2016/0070262, which is hereby incorporated by reference, in its entirety. Further, in some embodiments, the sub-surface positioning system 142 of the loading path 122 may include the propulsion system of U.S. Pub. No. 2018/0056792, which is hereby incorporated by reference, in its entirety.

Moreover, in some embodiments the cable 23 is configured to lift the vehicle 14 from the loading path 122 prior to the vehicle 14 reaching an end 144 of the loading path 122 to ensure engagement of the locking device 66 of the gondola arm 86 with the gondola attachment 64 of the vehicle 14. Indeed, as discussed above, in some embodiments, the locking device 66 and the gondola attachment 64 may be engaged when the vehicle 14 is lifted such that the wheels 80 are not supporting the weight of the vehicle 14 or based on various sensor inputs. Accordingly, by lifting the vehicle 14 prior to the end of the loading path 122, the gondola attachment 64 may be actuated to cause engagement between the gondola arm 86 and vehicle 14 while the vehicle 14 is disposed over the surface of the loading path 122. In this manner, if the gondola arm 86 and the vehicle 14 are not adequately engaged when the vehicle 14 is lifted from the surface of the loading path 122, as discussed above, the gondola system 16 may discontinue operation (e.g., in response to one or more signals from the controller 40) such that the vehicle 14 is held stationary over the loading path 122 via the cable 23. One or more maintenance operations may then be carried out on the vehicle 14, such as by system operators/technicians.

Figure 8:
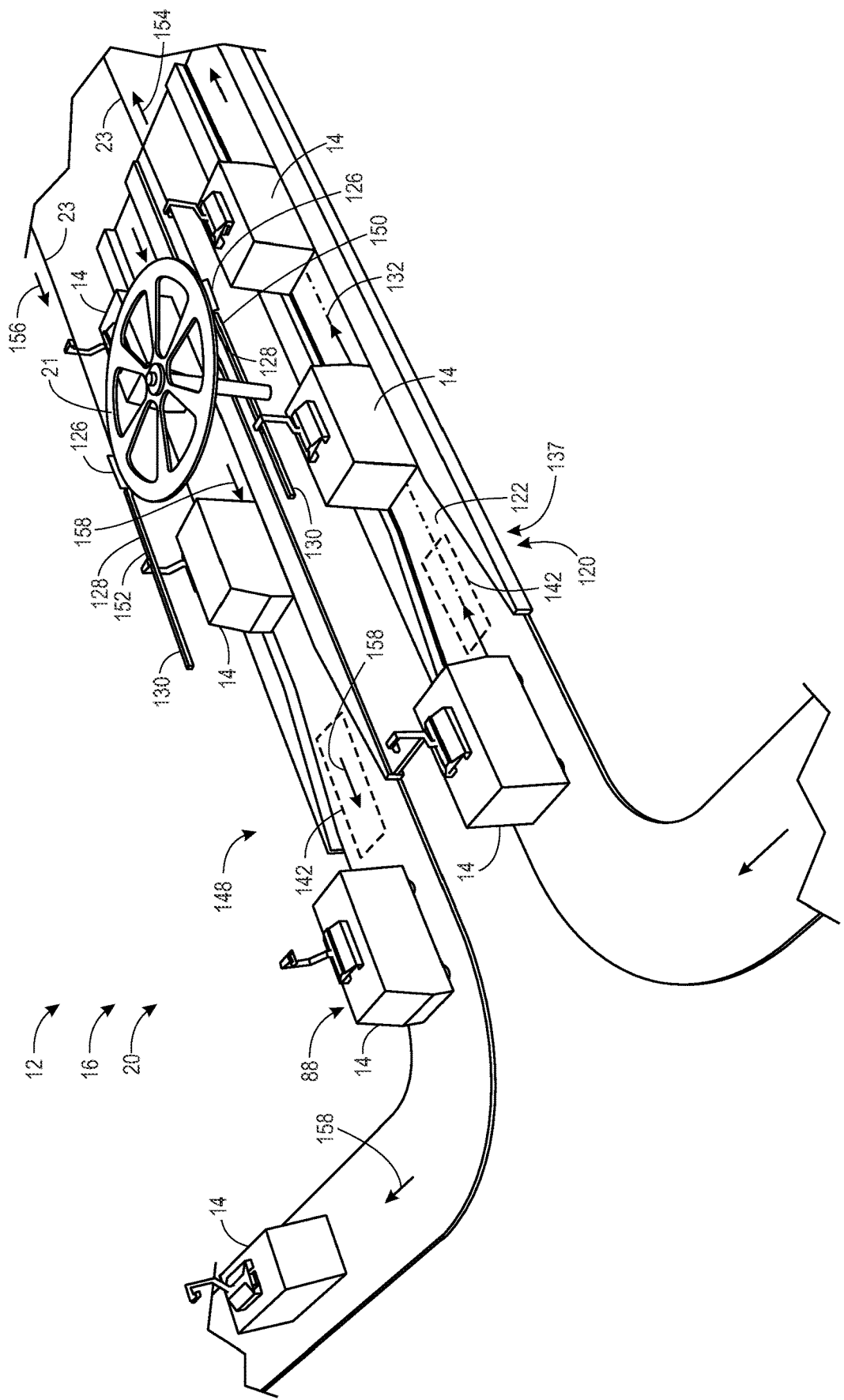
FIG. 8 is a perspective view of an embodiment of the autonomous vehicle transportation system of FIG. 2, in accordance with aspects of the present disclosure.

FIG. 8 is a perspective view of the autonomous vehicle transportation system 12, which includes the vehicles 14 and the gondola system 16. Specifically, FIG. 8 includes a gondola station 20 having a departure zone 120 and an arrival zone 148. Similar to embodiments discussed above in reference to FIG. 7, the gondola station 20 may include the loading path 122, the guide rail 138, the sub-surface positioning system 142, the arm carrier 128, and the bull wheel 21. In the current embodiment, the vehicles 14 include the gondola arm 86 integrally attached to the top 88 of the vehicle 14. Accordingly, the arm carrier 128 may include separate first and second portions 150,152. Particularly, the first portion 150 of the arm carrier 128 may be associated with the departure zone 120 and the second portion 152 of the arm carrier 128 may be associated with the arrival zone 148. For example, the vehicle 14 may drive to the loading path 122 and interact with the guidance system 137 (e.g., the guide rails 138 and/or the sub-surface positioning system 142). That is, the guidance system 137 may place the vehicle 14 on the center line 132 of the loading path 122. Once positioned on the center line 132, the vehicle 14 may couple to the first portion 150 of the arm carrier 128. The drive elements 130 of the arm carrier 128 may then drive the gondola arm 86 and the vehicle toward the cable 23, where the attachment manager 126 is configured to cause the grip 108 to couple to the cable 23. In some embodiments, the motor 48 of the vehicle 14 may drive the vehicle 14 along the arm carrier 128 (e.g., via the wheels 80) toward the cable 23, where the attachment manager 126 is configured to cause the grip 108 to couple to the cable 23. Once coupled to the cable 23, the cable 23 may carry the vehicle 14 to a corresponding gondola station 20, as indicated by arrow 154.

When the vehicles 14 arrive to the gondola station 20 via the cable 23, as indicated by arrow 156, the grip 108 of the gondola arm 86 may interact with the attachment manager 126 of the second portion 152 of the arm carrier 128. Particularly, the attachment manager 126 may cause the grip 108 of the gondola arm 86 to detach from the cable 23, and position the grip 108 along the second portion 152 of the arm carrier 128. Once on the second portion 152 of the arm carrier 128, the drive elements 130 of the arm carrier 128 may motivate the vehicles 14 forward, out of the gondola station 20, as indicated by arrows 158. In some embodiments, the motor 48 of the vehicle 14 may drive the vehicle 14 along the arm carrier 128 (through contact with the ground), out of the gondola station 20.

Figure 9:
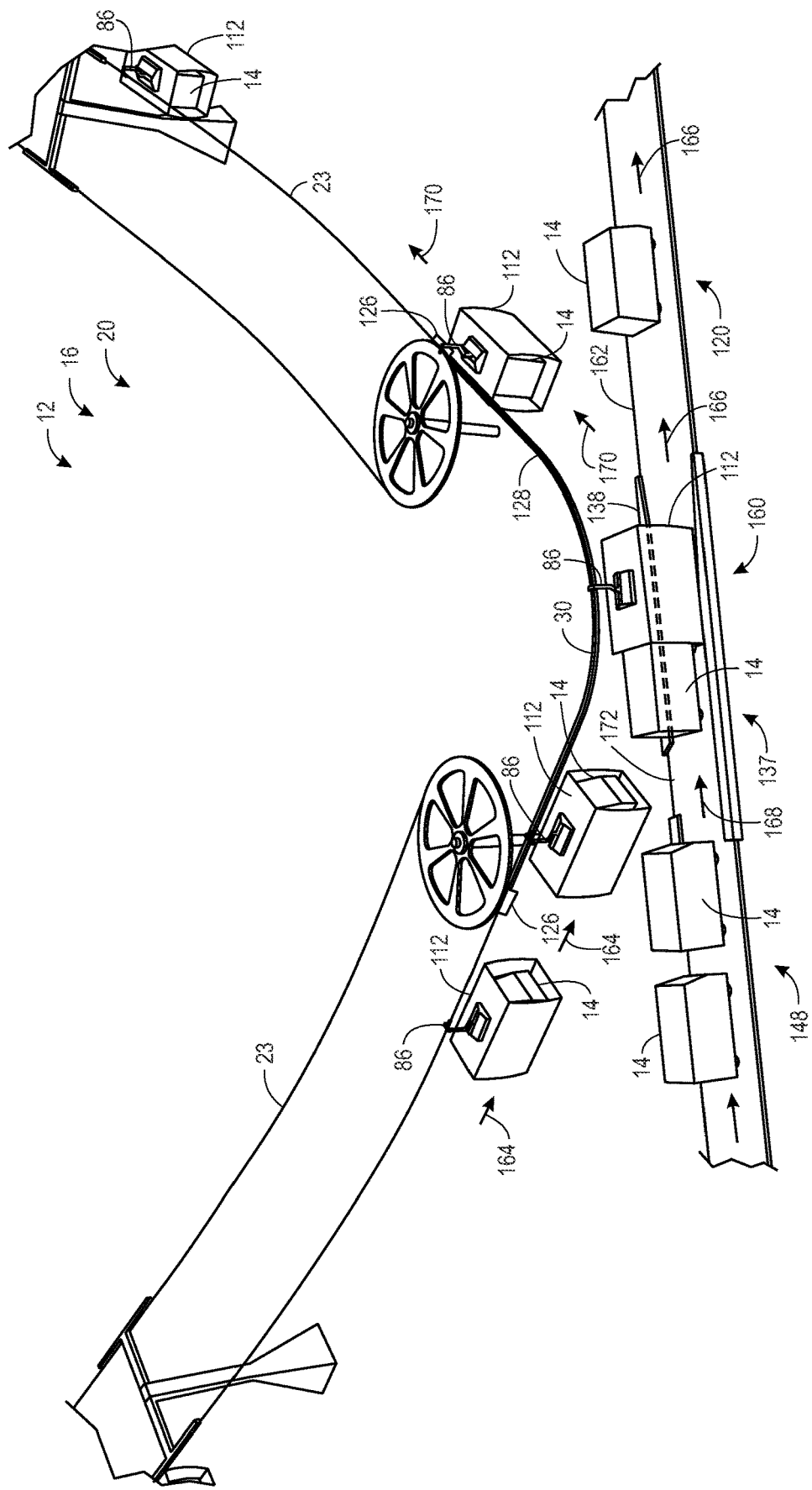
FIG. 9 is a perspective view of an embodiment of the autonomous vehicle transportation system of FIG. 2, in accordance with aspects of the present disclosure.

FIG. 9 is a perspective view of the autonomous vehicle transportation system 12, which includes the vehicles 14 and the gondola system 16. Specifically FIG. 9 includes a gondola station 20 having both an arrival zone 148 and a departure zone 120 directly coupled via a transition zone 160. In other words, the gondola station 20 includes a single path 162 in which the vehicles 14 are configured to engage with, and disengage from, the vehicle compartment 112. Indeed, in the current embodiment, the gondola system 16 includes the gondola arm 86 integrally coupled to the vehicle compartment 112, as discussed above in FIG. 6. To illustrate, the vehicles 14 (or the vehicle compartments 112 absent of vehicles 14) are configured to arrive at the gondola station 20 via the cable 23, as indicated by arrows 164. At the same time, vehicles 14 may be positioned along the path 162 of the arrival zone 148. When the vehicle compartment 112 arrives to the transition zone 160, a grip 108 of the gondola arm 86 may interact with the attachment manager 126 to decouple the grip 108 from the cable 23, and position the grip 108 onto the arm carrier 128. Once on the arm carrier 128, the drive elements 130 may position the vehicle compartment 112 within the transition zone 160 of the ride path 162. Once positioned along the transition zone 160 of the ride path 162, if the vehicle compartment 112 is engaged with a vehicle 14, the vehicle compartment 112 may disengage from the vehicle 14 and the vehicle 14 may drive off from the vehicle compartment 112, as indicated by arrows 166. Once the vehicle 14 has driven off from the vehicle compartment 112, a vehicle 14 from the departure zone 120 may drive into the vehicle compartment 112, as indicated by arrow 168, and may engage with the vehicle compartment 112, as discussed above in reference to FIG. 6. In other words, once the vehicle compartment 112 is stationed on the transition zone 160 without a vehicle 14 engaged to the vehicle compartment 112, the next vehicle 14 in the arrival zone 148 may drive into, and engage with, the vehicle compartment 112. Once the vehicle 14 from the arrival zone 148 is engaged with the vehicle compartment 112, the drive elements 130 may move the vehicle compartment 112 to the cable 23, where the grip 108 of the gondola arm 86 may interact with the attachment manager 126. The attachment manager 126 may then couple the grip 108 to the cable 23, and the cable 23 may carry the vehicle 14 to a corresponding gondola station 20, as indicated by arrows 170.

Further, it should be noted that the length of the arm carrier 128 may be designed based on an estimated throughput of the gondola station 20. Indeed, the length of the arm carrier 128, as shown, is merely an example of a possible length of the arm carrier 128. In some embodiments, the arm carrier 128 may be longer in length to hold an increased number of gondola arms 86 (and/or vehicle compartments 112). Indeed, in some embodiments, the gondola arms 86 may arrive to the gondola station 20 at faster rate than vehicles 14 may disengage and engage with the vehicle compartment 112 in the transition zone 160. In such embodiments, it may be beneficial for the arm carrier 128 to store an adequate number of vehicle compartments 112.

Moreover, in some embodiments, the path 162 may include the guidance system 137, which may include the sub-surface positioning system 142 and/or the guide rails 138. As shown, in the current embodiment, the guide rails 138 may include a gap 172 along the edge of the path 162 disposed adjacent to the arm carrier 128. The gap 172 is to permit the vehicle compartment 112 to enter the path 162 through the gap 172.

Figure 10:
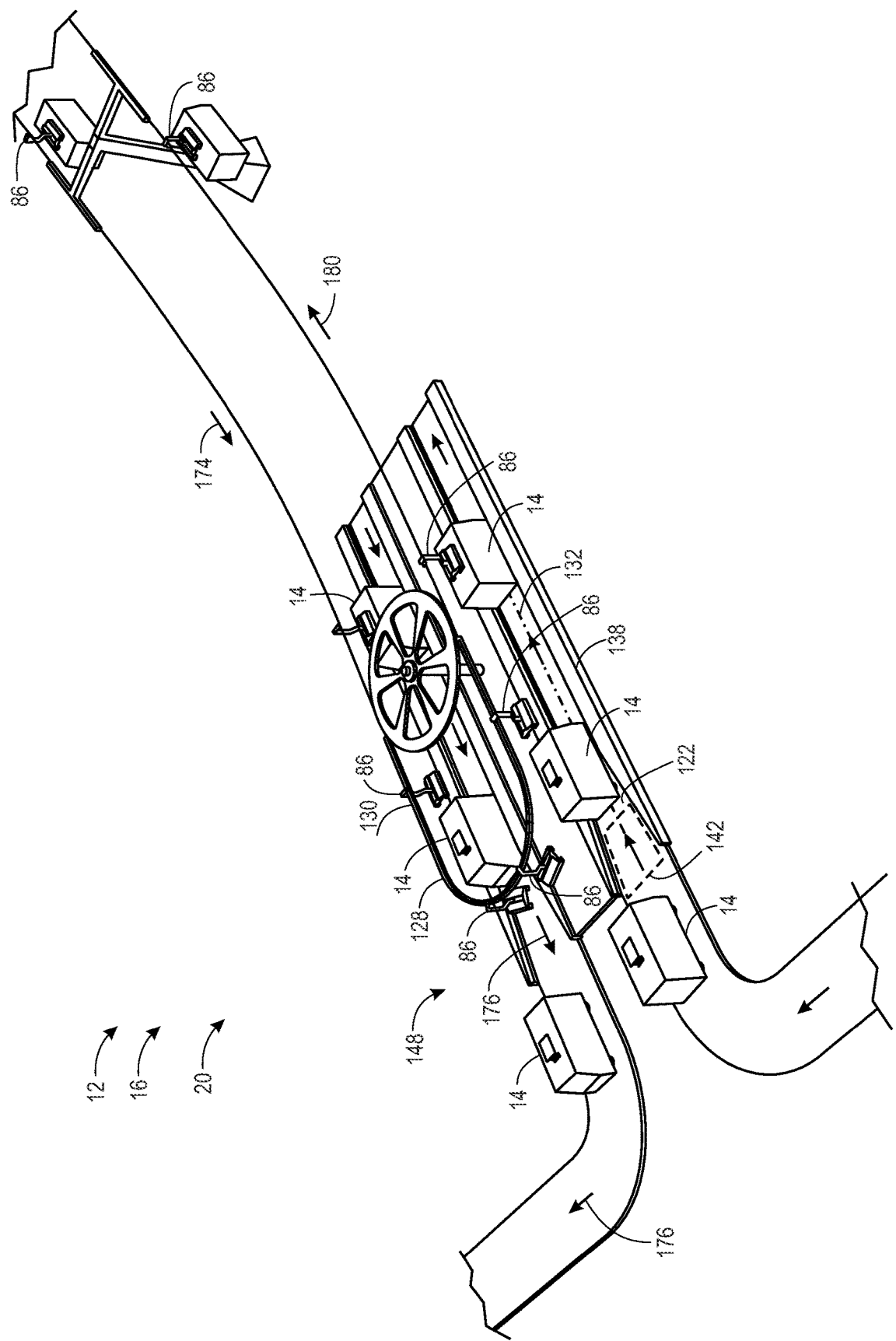
FIG. 10 is a perspective view of an embodiment of the autonomous vehicle transportation system of FIG. 2, in accordance with aspects of the present disclosure.

FIG. 10 is a perspective view of an embodiment of the autonomous vehicle transportation system 12, which includes the vehicles 14 and the gondola system 16. Embodiments illustrated in FIG. 10 may be similar to the embodiments discussed above in reference to FIG. 8. However, as oppose to the having the first portion 150 of the arm carrier 128 and the second portion 152 of the arm carrier 128, the arm carrier 128 may be a continuous unit that couples the arrival zone 148 to the departure zone 120. For example, when a vehicle 14 approaches the gondola station 20 via the cable, as indicated by arrow 174, the vehicle 14 may decouple from the gondola arm 86 and exit from the gondola station 20, as indicated by arrows 176. Once the vehicle 14 disengages from the gondola arm 86, the gondola arm 86 may continue along the arm carrier 128 to the departure zone 120 in response to the drive elements 130. Once the gondola arm 86 is in line with the center line 132 of the loading path 122 of the departure zone 120, the gondola arm 86 may couple to a vehicle 14 from the departure zone 120. The gondola arm 86 may then carry the vehicle 14 along the gondola path 18, out of the gondola station 20, as indicated by arrow 180.

Figure 11:
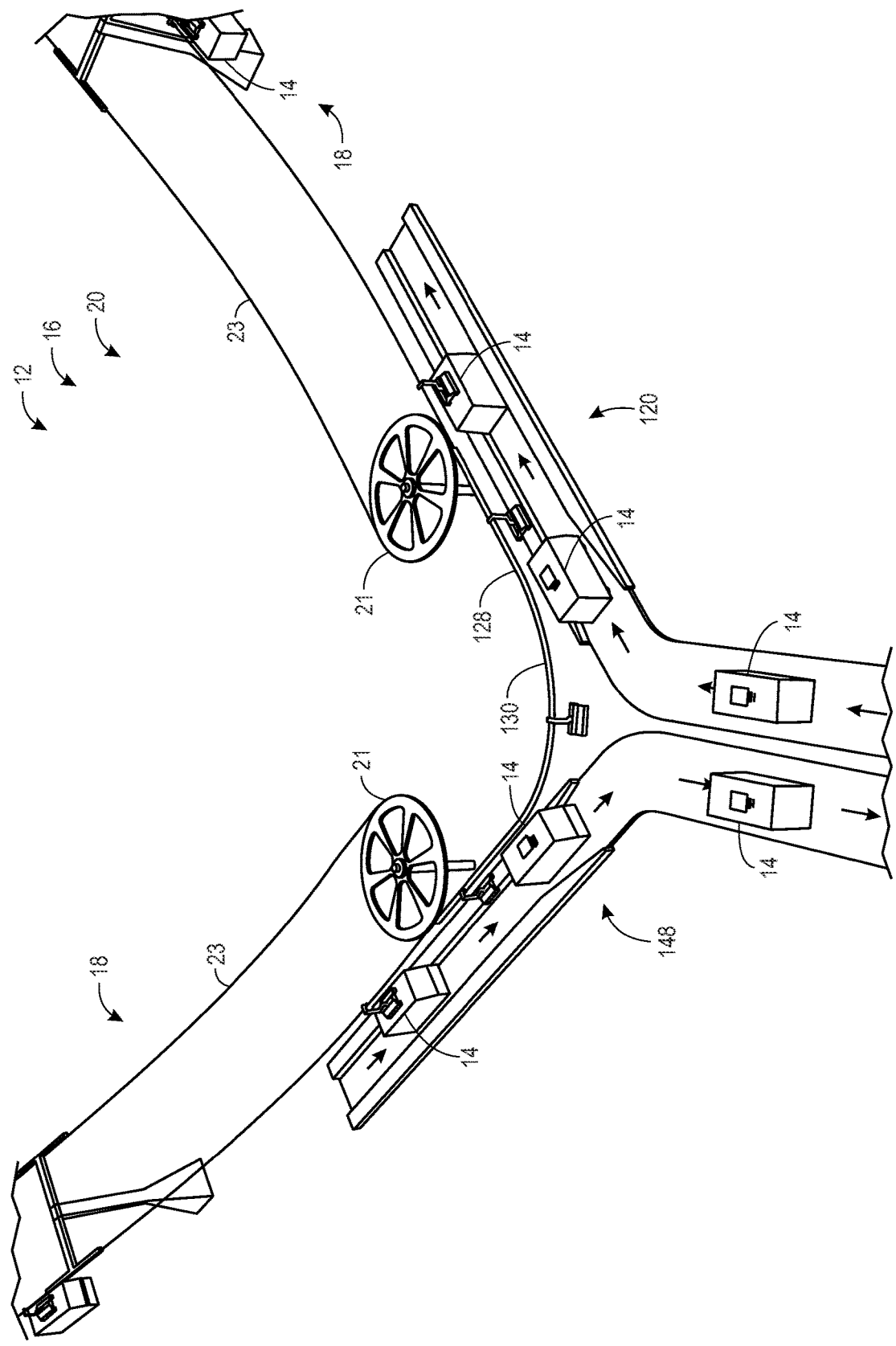
FIG. 11 is a perspective view of an embodiment of the autonomous vehicle transportation system of FIG. 2, in accordance with aspects of the present disclosure.

FIG. 11 is a perspective view of an embodiment of the autonomous vehicle transportation system 12, which includes the vehicles 14 and the gondola system 16. Embodiments illustrated in FIG. 11 may be similar to the embodiments discussed above in reference to FIG. 10. However, the gondola station 20 may include an arrival zone 148 corresponding to a separate gondola path 18 from a departure zone 120. For example, as shown, the gondola paths 18 may form a ninety degree angle. However, it is to be understood that there may be any suitable angle between the gondola paths 18.

Similar to FIG. 7, the vehicles 14 illustrated in FIG. 11 are configured to engage with the cable 23 of a gondola path 18 at a departure zone 120 of a gondola station 20. The same gondola station 20 may further include an arrival zone 148 of a separate gondola path 18. The arrival zone 148 may function similarly to the arrival zone 148 of FIG. 10. Moreover, the gondola station 20 may include an arm carrier 128 that is coupled between the bull wheel 21 of the departure zone 120 and the bull wheel 21 of the arrival zone 148. Indeed, similar to the arm carrier 128 of FIG. 10, the arm carrier 128 is configured to move gondola arms 86 from the arrival zone 148 to the departure zone 120, as shown, via the drive elements 130. Indeed, in some embodiments, the arm carrier 128 may be configured to store the gondola arms 86 that come from gondola path 18 corresponding the arrival zone 148, and transfer the gondola arms 86 to the departure zone 120 as necessitated by the arrival of vehicles 14 to the departure zone 120.

Figure 12:
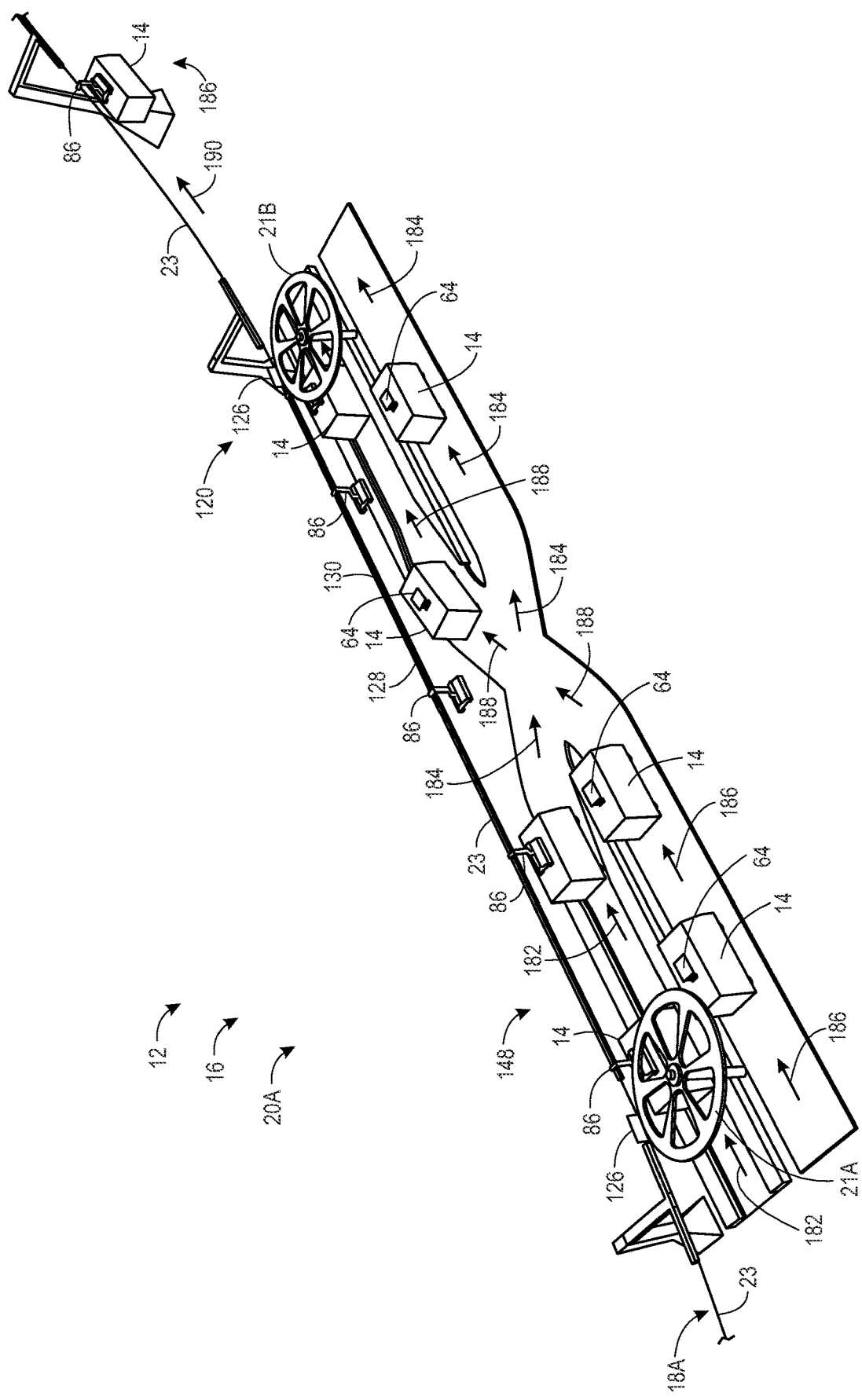
FIG. 12 is a perspective view of an embodiment of the autonomous vehicle transportation system of FIG. 2, in accordance with aspects of the present disclosure.

FIG. 12 is a perspective view of the autonomous vehicle transportation system 12, which includes the vehicles 14 and the gondola system 16. As shown, in some embodiments, the gondola station 20a may be disposed along a gondola path 18, such as in between bull wheels 21 of the gondola path 18 (as shown by the gondola station 20a of FIG. 1). Indeed, the arrival zone 148 and the departure zone 120 of the gondola station 20a may be substantially in-line or parallel. To illustrate, vehicles 14 may arrive to the arrival zone 148 via the cable 23 and interact with the attachment manager 126, as indicated by arrows 182. The attachment manager 126 may disengage the grip 108 of the gondola arm 86 from the cable 23, and position the grip 108 onto the arm carrier 128. In some embodiments, the cable 23 may continue along, or adjacent to, the arm carrier 128. Once disposed on the arm carrier 128, the gondola arm 86 may disengage from the gondola attachment 64 of the vehicle 14. Once disengaged, the vehicle 14 may exit the gondola station 20, as indicated by arrows 184. Further, once the vehicle 14 is disengaged from the gondola arm 86, the gondola arm 86 may be motivated along the arm carrier 128 by the drive elements 130. Specifically, the gondola arm 86 may be positioned at the departure zone 120 to couple to a different vehicle 14. Indeed, vehicles 14 may arrive to the gondola station 20 via a path separate from the arrival zone 148, as indicated by arrows 186. The vehicles 14 that arrive at the gondola station 20 may drive to the departure zone 120, as indicated by arrows 188, where the vehicles 14 will couple to the gondola arm 86. Once coupled to the gondola arm 86, the gondola arm 86 and the vehicle 14 may move further along the arm carrier 128 (e.g., in response to the vehicle motor 48 and/or the arm carrier 128 drive elements 130) where the grip 108 of the gondola arm 86 will interact with the attachment manager 126. Specifically, the attachment manager 126 may cause the grip 108 to couple to the cable 23. Once coupled to the cable 23, the cable 23 may pull the gondola arm 86 and the vehicle 14 along the gondola path 18 out of the gondola station 20a, as indicated by arrow 190.

In some embodiments, a vehicle 14 may arrive to the arrival zone 148, maintain engagement with the gondola arm 86 as the gondola arm 86 moves along the arm carrier 128, and continue to the departure zone 120, where the vehicle 14 will continue along the gondola path 18. Further, in some embodiments, the gondola station 20a may be disposed between two separate gondola paths 18. For example, in some embodiments, the gondola station may include a first bull wheel 21 configured to motivate the cable 23 through a first gondola path 18a. The gondola station 20 may further include a second bull wheel 21b configured to motivate the cable 23 through a second gondola path 18b. In this manner, in some embodiments, the first gondola path 18a may be positioned at an angle relative to the second gondola path 18b.

Discussion of the embodiments illustrated in FIGS. 7-12 may have focused on specific embodiments of the gondola attachment 64, the gondola arm 86, the vehicle compartment 112, or a combination thereof in order to provide concise explanation of the embodiments. However, it is to be understood that the gondola stations 20 of FIGS. 7-12 may include any combination of the gondola attachment 64, the gondola arm 86, and/or the vehicle compartment 112, such as is shown in FIGS. 3-6.

Moreover, as discussed herein, certain embodiments of the autonomous vehicle transportation system 12 may rely on engaging with either the gondola arm 86 and/or the vehicle compartment 112 in order to engage the vehicle 14 with the gondola system 16. To this end, in some embodiments, the controller 40 may determine the location of each of the vehicles 14 (e.g., via the sensors 58) and may provide a corresponding number of gondola arms 86 and/or vehicle compartments 112 at the appropriate gondola stations 20 to facilitate travel of the vehicle 14 via the gondola system 16. For example, the destination of the vehicle 14, which may be received through the user input 60, may require utilization of one or more specific gondola stations 20. Accordingly, the controller 40 may send one or more signals to the gondola system 16 such that the gondola system 16 transfers a suitable number of gondola arms 86 and/or vehicle compartments 112 to the appropriate gondola station 20 to facilitate efficient travel of the vehicle 14 to its destination. In other words, the controller may ensure that each gondola station 20 to be used in the vehicle's 14 travel includes a suitable number of gondola arms 86 and/or vehicle compartments 112 so that vehicles 14 do not wait an excessive amount of time at the gondola stations 20 to utilize the gondola system 16.

Overall, the autonomy of the vehicles 14 may greatly facilitate travel through the gondola system 16. Indeed, as discussed herein, engagement between the vehicles 14 and the gondola system 16 may require precise control of the vehicle 14. Accordingly, the autonomy of the vehicles 14 may provide the precise control to utilize the gondola system 16. However, it is to be understood that in some embodiments, the vehicles 14 may be non-autonomous vehicles 14.

While only certain features have been illustrated and described herein, many modifications and changes will occur to those skilled in the art. It is, therefore, to be understood that the appended claims are intended to cover all such modifications and changes as fall within the true spirit of the disclosure.

The invention claimed is:

1. A vehicle transportation system, comprising:
   a plurality of vehicles each configured to at least partially autonomously drive along a plurality of ground surface vehicle paths; and
   a gondola station comprising an arrival and a departure zone, wherein the arrival zone and the departure zone are separate from one another, wherein a first vehicle of the plurality of vehicles is configured to aerially arrive at the arrival zone via a cable of the gondola station, disengage from the cable, and drive along a first path to exit the gondola station, and wherein a second vehicle of the plurality of vehicles is configured to drive along a second path to enter the gondola station, engage with the cable, and depart from the departure zone via the cable.

2. The vehicle transportation system of claim 1, wherein each vehicle of the plurality of vehicles comprises a gondola attachment integrally coupled to a roof of the vehicle.

3. The vehicle transportation system of claim 2, wherein the gondola station comprises a plurality of gondola arms, wherein each gondola arm of the plurality of gondola arms comprises a locking device configured to engage with the gondola attachment.

4. The vehicle transportation system of claim 3, wherein the first vehicle is configured to arrive at the arrival zone while aerially secured to the gondola station by a gondola arm of the plurality of gondola arms, a respective locking device of the gondola arm, and the gondola attachment of the first vehicle, and wherein the first vehicle is configured to disengage from the gondola station through disengagement of the respective locking device from the gondola attachment.

5. The vehicle transportation system of claim 3, wherein the second vehicle is configured to engage with the gondola station through engagement of the gondola attachment of the second vehicle to a respective locking device of a gondola arm of the plurality of gondola arms, and wherein the second vehicle is configured to depart from the departure zone while aerially supported by the gondola attachment of the second vehicle, the respective locking device, and the gondola arm.

6. The vehicle transportation system of claim 2, wherein the gondola station comprises an arm carrier and a plurality of gondola arms, wherein a gondola arm of the plurality of gondola arms is configured to engage with a respective gondola attachment of a vehicle of the plurality of vehicles, and wherein each gondola arm of the plurality of gondola arms comprises a grip configured to facilitate engagement or disengagement of the gondola arm to or from the cable and the arm carrier.

7. The vehicle transportation system of claim 6, wherein the gondola station comprises a bull wheel configured to drive the cable through the gondola station, wherein the arm carrier extends from the bull wheel as a continuous unit, wherein a respective gondola arm of the plurality of gondola arms coupled to the first vehicle is configured to disengage from the cable and engage to the arm carrier via the grip, and wherein the arm carrier is configured to motivate the first vehicle to drive along the first path to exit the gondola station.

8. The vehicle transportation system of claim 7, wherein the second vehicle is configured to engage with a second respective arm of the plurality of gondola arms coupled to the arm carrier, wherein the arm carrier is configured to motivate the second vehicle along the second path and attach the second respective arm to the cable via the grip to aerially transport the second vehicle via the cable.

9. The vehicle transportation system of claim 1, wherein the arrival zone and the departure zone are separate from one another by a structure.

10. A vehicle transportation system, comprising:
   a plurality of autonomous vehicles each configured to drive along ground surface vehicle paths within a plurality of separated areas; and
   a plurality of gondola stations, wherein each gondola station of the plurality of gondola stations comprises a transition zone having a first path and a second path, wherein a first autonomous vehicle of the plurality of autonomous vehicles is configured to aerially arrive at the transition zone via a cable of the gondola station, disengage from the gondola station, and drive along the first path to exit the gondola station, wherein a second autonomous vehicle of the plurality of autonomous vehicles is configured to drive along the second path, engage with the gondola station, and aerially depart from the gondola station via the cable, and wherein the first path and the second path are separate from one another.

11. The vehicle transportation system of claim 10, wherein the first path and the second path are directly coupled via the transition zone.

12. The vehicle transportation system of claim 10, wherein each gondola station of the plurality of gondola stations comprises a plurality of vehicle compartments configured to receive and transport an autonomous vehicle of the plurality of autonomous vehicles.

13. The vehicle transportation system of claim 12, wherein each gondola station comprises a bull wheel configured to drive the cable through the gondola station and an arm carrier configured to position a vehicle compartment of the plurality of vehicle compartments into the transition zone.

14. The vehicle transportation system of claim 13, wherein each vehicle compartment of the plurality of vehicle compartments comprises a gondola arm having a grip configured to attach to or detach the vehicle compartment from the cable, wherein the arm carrier comprises an attachment manager, and wherein the attachment manager is configured to attach and detach the vehicle compartment to and from the cable and the arm carrier via the grip to position the vehicle compartment into the transition zone.

15. The vehicle transportation system of claim 13, wherein a length of the arm carrier corresponds to a number of vehicle compartments supported by a respective gondola station of the plurality of gondola stations and on an estimated throughput of the respective gondola station.

16. A vehicle transportation system, comprising:
a plurality of autonomous vehicles each configured to drive along ground surface vehicle paths, wherein each autonomous vehicle of the plurality of autonomous vehicles comprises a gondola arm integrally coupled to a roof of the autonomous vehicle; and
a plurality of gondola stations, wherein each gondola station of the plurality of gondola stations comprises a loading zone and an unloading zone, wherein a first autonomous vehicle of the plurality of autonomous vehicles is configured to aerially arrive at the unloading zone via a cable of the gondola station, decouple from the gondola station via disengagement of the gondola arm of the first autonomous vehicle from the cable, and exit the gondola station, wherein a second autonomous vehicle of the plurality of autonomous vehicles is configured to enter the loading zone, couple to the cable via engagement of the gondola arm of the second autonomous vehicle to the cable, and aerially depart from the gondola station, and wherein the loading zone and the unloading zone are separate from one another.

17. The vehicle transportation system of claim 16, wherein a gondola station of the plurality of gondola stations comprises:
a first arm carrier;
a second arm carrier; and
a bull wheel configured to drive the cable through the gondola station, wherein the first arm carrier and the second arm carrier extend from the bull wheel separate from one another, and wherein the first arm carrier is configured to position the first autonomous vehicle into the unloading zone to exit the gondola station and the second arm carrier is configured to position the second autonomous vehicle into the loading zone to aerially transport the second autonomous vehicle via the gondola station.

18. The vehicle transportation system of claim 17, wherein each gondola arm coupled to the roof of each autonomous vehicle comprises a grip configured to separately facilitate a coupling between the cable, the first arm carrier, and the second arm carrier.

19. The vehicle transportation system of claim 16, comprising a guidance system configured to position the second autonomous vehicle onto a center line of the loading zone to facilitate engagement of the second autonomous vehicle to the cable, wherein the guidance system comprises one or more guide rails configured to contact respective sides of the second autonomous vehicle to direct the second autonomous vehicle to the center line, a sub-surface positioning system configured to interact with respective wheels of the second autonomous vehicle to direct the second autonomous vehicle to the center line, or a combination thereof.

20. The vehicle transportation system of claim 16, wherein the loading zone and the unloading zone are separate from one another by a distance or a structure.

* * * * *